Aug. 26, 1947.                A. J. PENICK                 2,426,371
                    CASING AND TUBING HEAD ASSEMBLY
                    Filed May 29, 1945           3 Sheets-Sheet 3

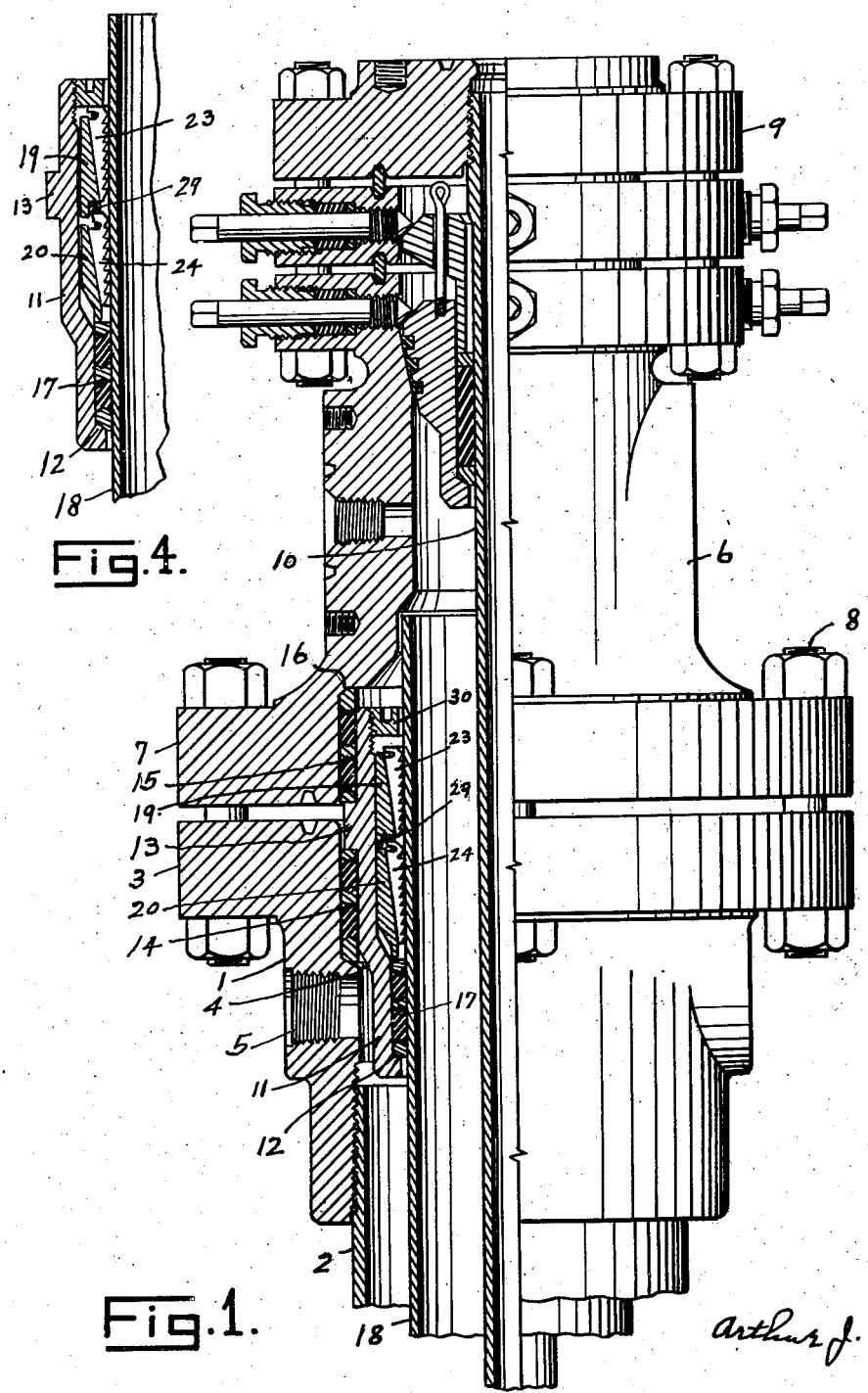

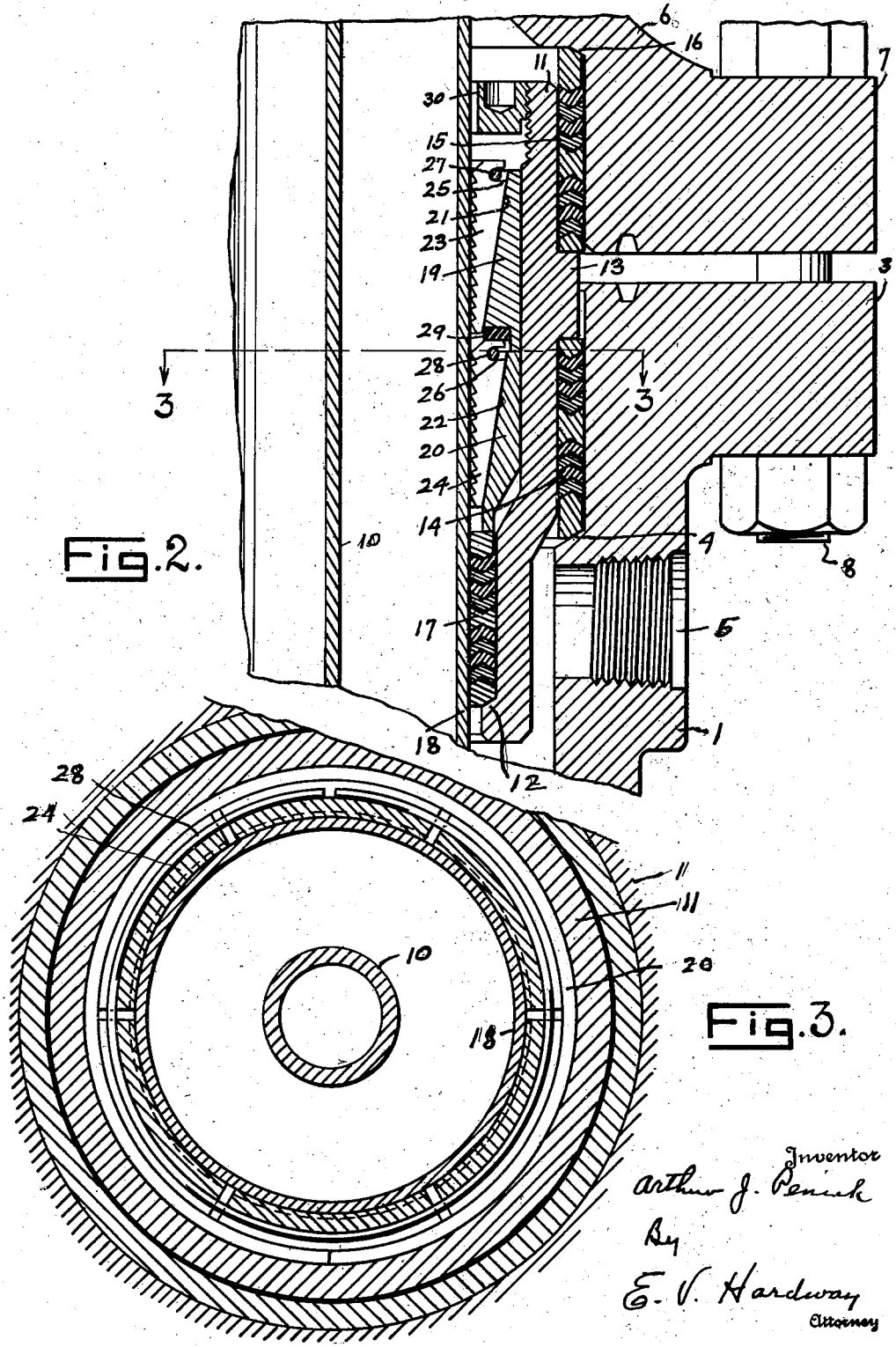

Inventor
Arthur J. Penick
By E V Hardway.
Attorney

Patented Aug. 26, 1947

2,426,371

UNITED STATES PATENT OFFICE 2,426,371

CASING AND TUBING HEAD ASSEMBLY

Arthur J. Penick, Houston, Tex., assignor to Oil Center Tool Company, Houston, Tex., a corporation of Texas Application May 29, 1945, Serial No. 596,509

9 Claims. (Cl. 285—22)

This invention relates to a casing and tubing head assembly.

An object of the invention is to provide, in an assembly of the character described, novel means for forming a fluid tight seal between the tubular heads of the assembly.

A further object of the invention is to provide novel means for suspending a well pipe from one of said heads, said suspending means comprising upper and lower slips for engaging the suspended pipe with a novel arrangement for causing a substantial uniform engagement of the upper and lower slips with the pipe to be suspended.

A further object of the invention is to provide in an assembly of the character described, a tubular retainer with upper and lower slip bowls therein and series of upper and lower pipe engaging slips in the respective bowls with a resilient ring on the lower slips forming a support for the upper bowl whereby the downward movement of the upper slips will be transmitted through said upper bowl and ring to the lower slips, to the end that the upper and lower slips will be caused to engage the suspended pipe equally.

It is a further object of the invention to provide a pipe suspending assembly wherein the retainer is surrounded with upper and lower seals between it and the respective tubular heads whereby a fluid tight seal is formed between said heads.

It is a further object of the invention to provide, in a pipe suspending assembly of the character described, a seal within the tubular retainer around the suspended pipe which is arranged to be subjected to an endwise compressive force by the lower slip bowl to form a seal around the suspended pipe.

With the above and other objects in view the invention has particular relation to certain novel features of construction, arrangement of parts, and use, an example of which is given in this specification and illustrated in the accompanying drawings, wherein:

Figure 1 shows a side elevation, partly in section, of the casing and tubing head assembly.

Figure 2 shows an enlarged, fragmentary, vertical, sectional view thereof.

Figure 3 shows a cross, sectional view taken on the line 3—3 of Figure 2.

Figure 4 shows a fragmentary, sectional view showing the pipe suspending means in position before subjected to the weight of the pipe.

Figure 5:
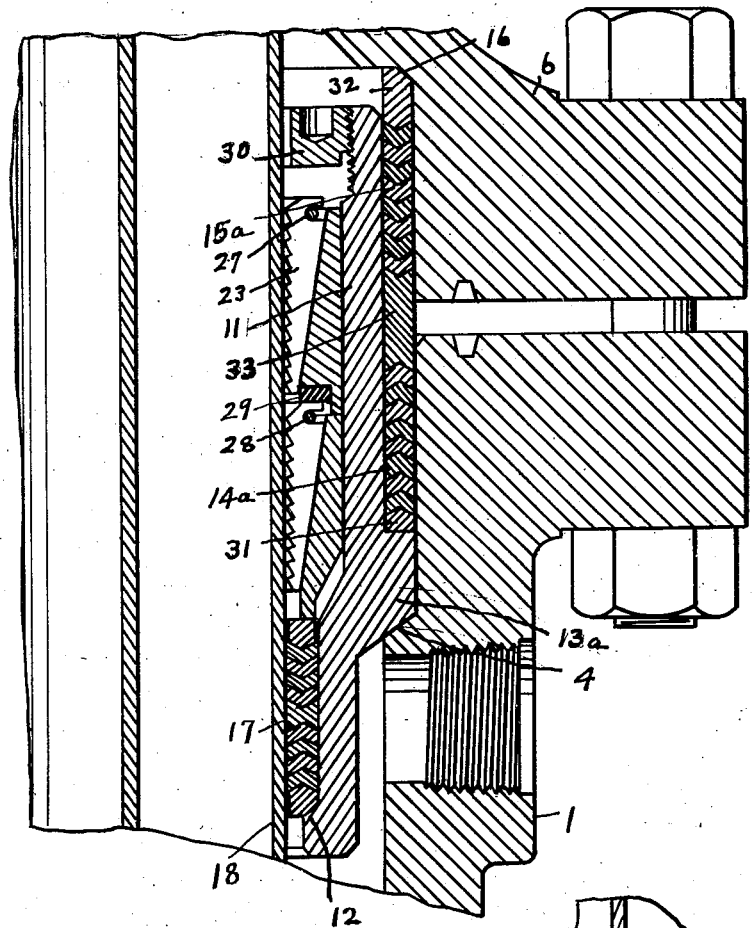
Figure 5 shows a fragmentary, vertical, sectional view showing another embodiment of the retainer packing.

Referring now more particularly to the drawings wherein like numerals of reference designate similar parts in each of the figures, the numeral 1 designates a casing head connected to the upper end of the well casing 2 and whose upper end is provided, in the present illustration, with an external, annular flange 3. The casing head is also provided with an internal, annular, upwardly facing seat 4 with an outlet 5 beneath said seat.

Mounted on the casing head there is a tubing head 6 whose lower end is provided with an external, annular flange 7 which may be connected to the casing head flange in any preferred manner as by the conventional clamp bolts 8.

Mounted on the assembly there is a flange 9 for supporting any type of well head equipment which may be mounted thereon, such as a Christmas tree and this flange supports the well tubing 10 which is suspended in the well. This tubing 10 is sealed by the use of conventional equipment, shown in Figure 1, but which will not be described in detail as it forms no part of the present invention.

Within the heads 1 and 6 there is a tubular retainer 11 whose lower end is reduced in diameter and formed with an inwardly extending flange at its lower end forming a seat 12. This retainer is also provided with an external rib 13 forming upwardly and downwardly facing annular shoulders.

There is a sealing assembly 14 between the downwardly facing shoulder and the seat 4 and which surrounds said retainer and there is a similar sealing assembly 15 on the upwardly facing shoulder and which surrounds said retainer. The tubing head 6 has an inside, annular shoulder 16 which engages the upper end of the sealing assembly 15. Accordingly, when the clamp bolts 8 are installed and the heads 1 and 6 drawn together the sealing assemblies 14 and 15 will be subjected to an endwise compressive force so as to form fluid tight seals about the retainer and between it and heads 1 and 6. The preferred form of the sealing assemblies 14 and 15 is shown in Figure 2 and consists of upper, intermediate and lower rings of relatively hard metal with rings of soft metal such as lead between them.

On the seat 12 there is a packing assembly 17 which surrounds, and forms a seal with, the pipe 18 which is suspended by the pipe suspending assembly.

Within the retainer 11 are the upper and lower slip bowls 19 and 20 which fit closely within said retainer. These slip bowls have the inside, downwardly converging seats 21, 22 whereon the upper and lower series of slips 23 and 24 are mounted.

The outer sides of these slips taper downwardly and their inner sides are toothed to engage with the pipe 18.

The upper ends of the slips have the external notches 25, 26 to receive the split rings 27 and 28 whereby the respective series of slips are maintained in assembled relation.

Supported on the upper ends of the series of slips 24 there is the resilient ring 29 preferably formed of rubber or similar material and which supports the upper slip bowl 19, as shown in Figure 1. The lower slip bowl 20 is supported on the packing assembly 17.

Screwed into the upper end of the tubular retainer 11 there is a ringnut 30 which rests against the upper end of the series of slips 23.

In assembling the head the tubular retainer with the sealing assemblies thereon may be installed in the casing head and the pipe 18 then let down into the well to the desired depth and the slip bowls 19 and 20 then installed with the series of slips 23 and 24 therein. The resilient ring 29 will also be installed between the upper slip bowl and the lower series of slips. The ringnut 30 may then be screwed downwardly against the slips 23 and the slips 23 and the slip bowl 19 will be forced downwardly compressing the ring 29 and forcing it against the upper ends of the slips 24 so as to also force said slips 24 downwardly and the lower end of the bowl 19 will finally land on the upper end of the bowl 20, as shown in Figure 1. As the slips 23, 24 are moved downwardly, relative to their respective bowls, said slips will be forced inwardly into contact with the pipe 18. The resilient ring 29 under compression will act with equal force upwardly against the slip bowl 19 and downwardly against the slips 24 so that the pressure applied to the upper and lower slips radially inwardly will be the same and the upper and lower slips will engage the pipe 18 equally.

Meanwhile the pipe 18 will have been suspended in the well by means of the conventional equipment used for lowering pipes into wells and when the pipe suspending assembly, as hereinabove described, has been assembled around the upper end of the pipe 18 said pipe may be released and it will be held by the upper and lower series of slips. However, the weight of the pipe 18 on said slips will cause the slips and slip bowls to move on downwardly, as a unit, as shown in Figure 1, compressing the seal ring assembly 17 and causing it to form a fluid tight seal around the pipe 18.

If the resilient ring 29 were not used and the upper slip bowl 19 supported directly on the lower series of slips 24 upon screwing the ring nut 30 downwardly against the upper series of slips said upper slip bowl would move downwardly and force the lower series of slips downwardly, and radially inwardly against the pipe 18 so that the lower slips would be forced inwardly against the pipe 18 further than the upper series of slips 23 and with the full weight of the pipe 18 released on said slips the main weight of the pipe would be carried by the lower set of slips thus causing said slips to cut into the pipe. This has been found to be true in practice but it does not happen when the resilient ring 29 is interposed between the upper slip bowl and the lower set of slips.

The tubing head 6 may then be installed and the inner pipe 18 lowered, anchored in place and sealed, as indicated in Figure 1.

Figure 6:
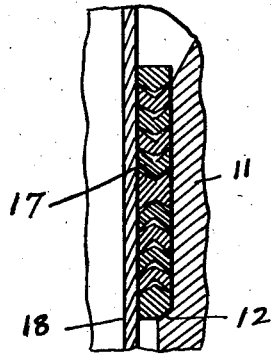
Figure 6 shows a fragmentary, vertical, sectional view.

In the embodiment shown in Figures 5 and 6 the rib 13a is seated directly on the seat 4 and there is a single packing assembly supported on said rib 13a and confined between it and the annular shoulder 16. This sealing assembly may be composed of the lower and upper hard metal rings 31, 32 and an intermediate metal ring 33 with the lower and upper ring assemblies 14a and 15a between the intermediate ring 33 and the corresponding end rings 31, 32. The ring 33 is relatively wide and is arranged opposite the joint between the casing head 1 and tubing head 6. The rings 14a, 15a are V-shaped and nested together, as shown in Figure 5, and they may be formed of relatively soft metal if desired although this is not essential.

The packing assembly located within the retainer 11 and around the pipe 18, as shown in Figure 5, is substantially the same as that shown in Figure 2. It is illustrated in Figure 6 before the endwise force has been applied thereto to compress the same.

The drawings and description are illustrative merely while the broad principle of the invention is defined by the appended claims.

What I claim is:

1. A casing and tubing head assembly comprising, a casing head, a tubing head thereon, a tubular retainer in the assembly having external, annular upwardly and downwardly facing shoulders, packing assemblies within the respective heads abutting said shoulders and means on the respective heads for applying endwise compressive force to the packing assemblies when the heads are drawn together.

2. A casing and tubing head assembly comprising, two tubular heads one mounted on the other and secured together, a tubular retainer in the heads and breaking the joint between them, said retainer having external upwardly and downwardly facing shoulders, a seat in the lower head, a packing assembly on said seat and surrounding said retainer and on which the downwardly facing shoulder rests, a packing assembly around the retainer resting on said upwardly facing shoulder and on which the upper head rests, said packing assemblies each being composed of upper, intermediate and lower rings of hard material with rings of softer material between them, said packing assemblies being arranged to be subjected to an endwise compressive force when said heads are clamped together.

3. A casing and tubing head assembly comprising, two tubular heads one mounted on the other, means for clamping said heads together, a tubular retainer within the heads, a packing assembly within said retainer and shaped to surround an inner pipe, upper and lower slip bowls, the lower slip bowl being supported on said packing assembly, series of upper and lower slips mounted in said bowls, a resilient ring on the lower series of slips and supporting the upper bowl.

4. A casing and tubing head assembly comprising, two tubular heads one mounted on the other, means for clamping said heads together, a tubular retainer within the heads, a packing assembly within said retainer and shaped to surround an inner pipe, upper and lower slip bowls, the lower slip bowl being supported on said packing assembly, series of upper and lower slips mounted in said bowls, a resilient ring on the lower series of slips and supporting the upper bowl and a ringnut threaded into the retainer and engageable against the upper ends of the slips of the upper series.

5. In a casing and tubing head assembly, a tubular retainer within said assembly, a seal within the retainer shaped to surround an inner pipe, upper and lower slip bowls in the retainer, the lower slip bowl being supported on said seal, series of upper and lower slips in said bowls, an annular resilient member on the lower series of slips and supporting the upper bowl and means connected to the retainer and operative to apply pressure to the slips of the upper series.

6. In a casing and tubing head assembly, a tubular retainer within the assembly, upper and lower slip bowls in the retainer having downwardly converging slip seats, a series of slips on the upper seat, a series of slips on the lower seat and an annular resilient member supporting the upper slip bowl on the lower series of slips.

7. A casing and tubing head assembly comprising, two tubular heads one mounted on the other, means for clamping said heads together, a tubular retainer within the heads, a packing assembly formed of metal rings around the retainer and between it and both of said heads and breaking the joint between said heads and means for applying an endwise compressive force to said packing assembly when said heads are clamped together.

8. In a casing and tubing head assembly, an annular seal formed of metal rings approximately V-shaped in cross section and nested together, means for applying an endwise compressive force to said seal to expand the lips of said rings.

9. In a casing and tubing head assembly an outer, tubular part, an inner part within said outer part, an annular seal between said parts formed of metal rings approximately V-shaped in cross section and nested together, means for applying an endwise compressive force to said seal to expand the lips of said rings into contact with the outer and inner parts.

ARTHUR J. PENICK.

REFERENCES CITED

The following references are of record in the file of this patent:

UNITED STATES PATENTS

| Number | Name | Date |
| --- | --- | --- |
| 2,400,254 | Penick | May 14, 1946 |
| 1,949,961 | Hansen | Mar. 6, 1934 |
| 2,011,769 | Leman | Aug. 20, 1935 |